A. H. CRAWFORD.
Stable.

No. 227,150. Patented May 4, 1880.

WITNESSES:
A. Wood
C. Bendixen

INVENTOR:
Amos H. Crawford
per E. Laass, Attorney

UNITED STATES PATENT OFFICE.

AMOS H. CRAWFORD, OF LIVERPOOL, NEW YORK.

STABLE.

SPECIFICATION forming part of Letters Patent No. 227,150, dated May 4, 1880.

Application filed March 13, 1879.

*To all whom it may concern:*

Be it known that I, AMOS H. CRAWFORD, of Liverpool, in the county of Onondaga and State of New York, have invented new and useful Improvements in Stables, of which the following, taken in connection with the accompanying drawings, is a full, clear, and exact description.

This invention relates to a peculiar construction and arrangement of a stable-floor and devices connected therewith, which render the said floor elastic, constantly dry, self-cleaning, and durable, and whereby, also, effective and convenient means are obtained for treating disabled or diseased animals; and, furthermore, the stable is ventilated and provided with a stationary animal-power, which is never exposed to the weather, takes up no extra storage-room, and is readily available for performing various kinds of work usually required in and about a stable or barn without the delay and inconvenience of removing from the stall the animal designed to furnish the power.

The invention is clearly illustrated in the accompanying drawings, wherein—

Figure 1:
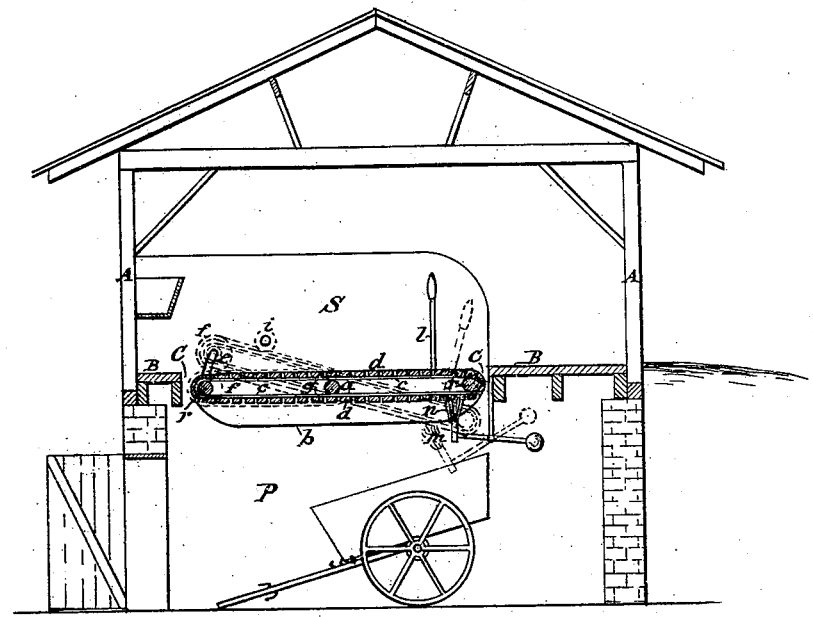
Figure 3:
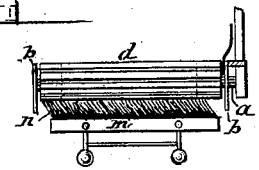
Figure 2:
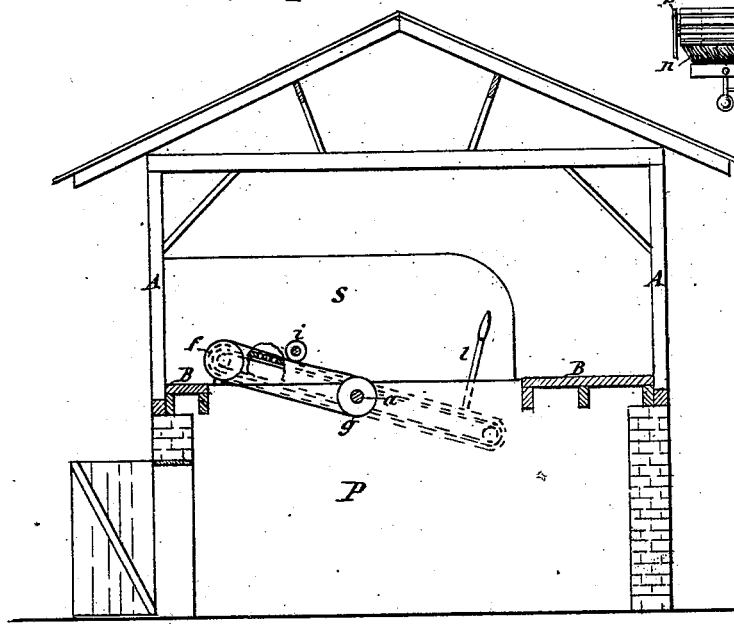

Figure 1 is a transverse vertical section taken through the center of the stall. Fig. 2 is a transverse vertical section taken at the side of the stall; and Fig. 3 is a detached end view of the pivoted floor, showing the arrangement of the brush or broom, whereby the said floor is rendered self-cleaning.

Similar letters of reference indicate corresponding parts.

A represents the upright frame of a stable constructed in any ordinary manner. B is the floor of the stable, constructed with an opening, C, extended the length and breadth of the stall S, in which the animal is kept. From end to end of the opening C, I suspend horizontally two or more chains or belts, $c$ $c$, to which I secure transverse slats $d$ $d$ short distances apart, thereby obtaining an elastic, constantly dry, and ventilating floor.

By employing endless chains or belts and extending them around rollers $r$ $r$, pivoted to the ends of longitudinal stringers or joists $b$, and pivoting the said stringers transversely at or near their center in the opening C, I am enabled to throw the said floor into an inclined position, and compel the animal standing thereon to revolve the endless tread by his weight. Thus a horse disabled for actual labor, or unable to be removed from the stall, can be given the necessary exercise.

The depression of the rear end of the floor produces thereat an opening, through which the manure which may be on the stall-floor can pass into the pit P or receptacle beneath, thereby compelling the horse to clean his stall. That part of the manure which has a tendency to adhere to the floor is swept off by a broom or brush, $m$, fixed to the end of a lever, weighted so as to yieldingly maintain the broom in contact with the inverted part of the floor.

In order to prevent the manure from filling the broom or brush the sweeping part, $n$, thereof is arranged oblique to the plane of the floor, as best seen in Fig. 3 of the drawings.

To further utilize the described movable stall-floor a line-shaft, $a$, is arranged transversely beneath the floor, in the center of the opening C, and the stringers $b$ are mounted on said shaft.

The journal of the forward roller $r$ is extended through an elongated opening, $e$, in the side of the stall, and is provided at the opposite side thereof with a pulley, $f$. The line-shaft $a$ is also provided with a pulley, $g$, in such relative position as to be connected with the pulley $f$ by a belt, $h$, all as shown by dotted lines in Fig. 1 of the drawings.

By means of a lever, $l$, or other suitable device, arranged convenient of access, the stall-floor is thrown from a horizontal into an inclined position, the angle of which is limited by the length of the opening $e$ in the side of the stall. The inclination of the stall-floor brings the belt $h$ in contact with a pulley, $i$, pivoted to the side of the stall, between the pulleys $f$ and $g$, and thus, in a great measure, prevents the jar incident to a sudden check of the tilting of the floor. The pressure of the belt $h$ against the pulley $i$ causes the former to tighten and transmit to the shaft $a$ the power produced by the weight of the animal standing on the stall-floor.

It will be observed that by this arrangement motive power can be readily communicated to a pump, feed-cutter, thrashing-machine, or other machine or apparatus usually employed in or about a stable without the loss of time or inconvenience of removing from the stable the animal required to furnish the power.

In addition to the advantages already set forth, which render my improvements especially desirable for veterinary stables, an effective and convenient preventive and cure of so-called "cocked ankles" of horses is obtained by holding the floor stationary in its inclined position and compelling the diseased horse to stand upon it.

Having thus fully described my invention, what I claim as new, and desire to secure by Letters Patent, is—

1. The combination and arrangement, with a stable, of a stall-floor formed of transverse slats secured to longitudinal chains or belts suspended from the ends of a frame pivoted transversely at or near its center in an opening in the floor of the stable, substantially as specified, for the purpose set forth.

2. The combination and arrangement, with a stable, of the pit P, opening C, shaft $a$, stringers $b$, mounted on said shaft, the rollers $r$ $r$, endless chains or belts $c$ $c$, transverse slats $d$, aperture $e$ in the side of the stall, pulley $f$ on the journal of the forward roller, pulley $g$ on shaft $a$, belt $h$, and tightening-pulley $i$, all arranged and combined substantially as described and shown.

3. In a combined stall-floor and animal-tread power, the combination of a tilting frame having the rollers $r$ pivoted within it, an endless tread, the pivotal shaft $a$, pulleys $f$ $g$, belt $h$, and belt-tightener $i$, the parts being arranged and combined to operate together as shown and described.

4. In combination with the revolving floor $d$, the broom $m$, held yieldingly against the inverted part of the floor by a weighted lever, substantially in the manner described.

5. In combination with the revolving floor $d$, the broom or brush $m$, held yieldingly against the inverted part of the floor by a weighted lever, and having its sweeping part $n$ oblique to the plane of same, substantially as and for the purpose set forth.

AMOS H. CRAWFORD.

Witnesses:
C. BENDIXEN,
A. WOOD.